United States Patent
Shinkawa et al.

(10) Patent No.: US 12,053,819 B2
(45) Date of Patent: Aug. 6, 2024

(54) POWDER METAL MATERIAL FOR ADDITIVE MANUFACTURING AND METHOD FOR PRODUCING NON-MAGNETIC STEEL

(71) Applicant: HONDA MOTOR CO., LTD., Tokyo (JP)

(72) Inventors: Masaki Shinkawa, Saitama (JP); Kazuo Kikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/119,060

(22) Filed: Mar. 8, 2023

(65) Prior Publication Data
US 2023/0311202 A1    Oct. 5, 2023

(30) Foreign Application Priority Data
Mar. 31, 2022    (JP) .................................. 2022-061341

(51) Int. Cl.
*B22F 1/052*    (2022.01)
*B22F 1/12*    (2022.01)
*B22F 10/38*    (2021.01)
*B33Y 70/10*    (2020.01)

(52) U.S. Cl.
CPC ................ *B22F 1/052* (2022.01); *B22F 1/12* (2022.01); *B22F 10/38* (2021.01); *B33Y 70/10* (2020.01)

(58) Field of Classification Search
CPC .. B22F 1/052; B22F 1/12; B22F 10/38; B22F 1/05; B22F 10/25; B22F 10/28; B33Y 70/10; B33Y 10/00; B33Y 70/00; C22C 38/001; C22C 38/04; C22C 38/12; C22C 1/059; C22C 33/0261; C22C 33/0228
See application file for complete search history.

(56) References Cited

U.S. PATENT DOCUMENTS 10,513,748 B2 * 12/2019 Niendorf .............. A61L 31/022
2018/0369909 A1 * 12/2018 Ibe .......................... C22C 29/08

FOREIGN PATENT DOCUMENTS

JP            6756994 B1     9/2020

* cited by examiner

*Primary Examiner* — John A Hevey
(74) *Attorney, Agent, or Firm* — Paratus Law Group, PLLC

(57) ABSTRACT

A powder metal material for additive manufacturing contains: (A) a non-magnetic steel powder which is free of nitrogen; and (B) a ferrovanadium nitride powder, and a particle size of the component (B) is 15.0 μm≤D50≤25.0 μm in terms of volume average particle size, and a content of the component (B) is 0.3 mass % to 3.0 mass % with respect to a total amount of the powder metal material.

15 Claims, No Drawings

POWDER METAL MATERIAL FOR ADDITIVE MANUFACTURING AND METHOD FOR PRODUCING NON-MAGNETIC STEEL

CROSS-REFERENCE TO RELATED APPLICATION

This application is based on and claims priority under 35 USC 119 from Japanese Patent Application No. 2022-061341 filed on Mar. 31, 2022.

TECHNICAL FIELD

The present invention relates to a powder metal material for additive manufacturing and a method for producing a non-magnetic steel.

BACKGROUND ART

It is known that solid solution strengthening or precipitation strengthening is a main method for increasing the strength of a non-magnetic steel, and solid solution strengthening with nitrogen is highly effective and has little resource risk. However, adding nitrogen requires special equipment such as a pressurized melting furnace and a large amount of energy. On the other hand, in a powder bed fusion method, which is a type of additive manufacturing, it is possible to form an alloy by mixing and laser-melting a plurality of types of powders, and it is conceivable to mix a nitrogen-containing powder to add nitrogen.

An additive manufacturing technique by mixing a nitride powder has been developed. JP6756994B discloses a powder for additive manufacturing obtained by mixing at least one ceramic particle consisting of a carbide, a nitride and a carbonitride with cemented carbide or a cermet alloy powder.

SUMMARY OF INVENTION

However, the above-recited conventional technique is a technique in which a conventional molding of a mixed powder by sintering is diverted to a technique for molding by additive manufacturing so that a nitride or the like is used as it is as a hard phase. In addition, the addition of nitrogen to the alloy is not the purpose, and the effect of solid solution strengthening by adding nitrogen is unknown. In addition, since it requires metal particles as a binder, it cannot be said that it aims at solid solution strengthening with nitrogen.

Further, nitrogen solidly dissolved in iron is likely to gasify during melting in additive manufacturing, causing void-like gas defects therein or blowing out to the outside, resulting in deterioration of surface properties. Therefore, there is still room for improvement in filling rate of an obtained manufactured body.

The present invention provides a powder metal material for additive manufacturing from which a manufactured body having an excellent filling rate can be obtained, and a method for producing a non-magnetic steel.

(1) The present invention provides, as an aspect, a powder metal material for additive manufacturing containing:
  (A) a non-magnetic steel powder which is free of nitrogen; and
  (B) a ferrovanadium nitride powder, in which
  a particle size of the component (B) is 15.0 µm≤D50≤25.0 µm in terms of volume average particle size, and
  a content of the component (B) is 0.3 mass % to 3.0 mass % with respect to a total amount of the powder metal material.

According to the present invention, it is possible to provide an additive manufacturing powder metal material from which a manufactured body having an excellent filling rate can be obtained, and a method for producing a non-magnetic steel.

DETAILED DESCRIPTION OF THE INVENTION

Hereinafter, embodiments for carrying out the present invention will be described in detail.

[Powder Metal Material for Additive Manufacturing]

(1) A powder metal material for additive manufacturing according to an aspect of the present invention contains:
  (A) a non-magnetic steel powder which is free of nitrogen; and
  (B) a ferrovanadium nitride powder, in which
  a particle size of the component (B) is 15.0 µm≤D50≤25.0 µm in terms of volume average particle size, and
  a content of the component (B) is 0.3 mass % to 3.0 mass % with respect to a total amount of the powder metal material.

With the powder metal material for additive manufacturing according to the present invention, a manufactured body having an excellent filling rate can be obtained.

<(A) Non-Magnetic Steel Powder being Free of Nitrogen>

The powder metal material according to the present invention contains (A) a non-magnetic steel powder being free of nitrogen (hereinafter referred to as a "component (A)" or a "non-magnetic steel powder").

Note that unless otherwise specified, the content of each alloying element is a mass-based value based on 100% of the entire non-magnetic steel powder.

The non-magnetic steel powder preferably contains 0.2% to 1.0% of C. C is an element that increases the strength of a steel. When the content of C is high, spatter is likely to occur during additive manufacturing, and the manufacturing time tends to be long in order to re-melt the generated spatter and render it harmless, so there is an appropriate range.

The content of C is more preferably 0.20% to 0.50%, and still more preferably 0.20% to 0.40%.

The non-magnetic steel powder preferably contains 8.0% to 15.0% of Mn.

The content of Mn is more preferably 10.0% to 15.0%, and still more preferably 10.0% to 12.0%.

The non-magnetic steel powder according to the present invention may contain other elements in addition to the above-recited elements. The other elements are not particularly limited as long as they do not interfere with the effects of the present invention, and examples thereof include Ni, Cr, and Mo.

When the non-magnetic steel powder according to the present invention contains Ni, the content of Ni is preferably 10.0 mass % or less, and more preferably 3.0 mass % or less.

When the non-magnetic steel powder according to the present invention contains Cr, the content of Cr is preferably 2.0 mass % to 20.0 mass %, and more preferably 3.0 mass % to 6.0 mass %.

When the non-magnetic steel powder according to the present invention contains Mo, the content of Mo is preferably 3.0 mass % or less, and more preferably 0.3 mass % to 1.0 mass %.

The non-magnetic steel powder according to the present invention preferably has the balance being Fe and inevitable impurities in the above-recited chemical composition.

The inevitable impurities are components that may be inevitably mixed from raw materials or the environment during the production of the non-magnetic steel powder in the present invention, and examples thereof include Si, P, S, and Cu. As for the content of the inevitable impurities, in the case of Si, the content is generally 1 mass % or less, in the case of P and S, the content is generally 0.1 mass % or less, and in the case of Cu, the content is generally 0.5 mass % or less.

The non-magnetic steel powder is free of nitrogen. Here, "free of nitrogen" means that the non-magnetic steel powder contains 0.01 mass % or less of nitrogen with respect to the total amount of the non-magnetic steel powder.

It is preferable that the particle size of the non-magnetic steel powder according to the present invention is D10≥20.0 μm and D90≤65.0 μm in terms of volume average particle size in the powder bed fusion method, and is D10≥50.0 μm and D90≤120.0 μm in the direct energy deposition method, which are measured with a laser diffraction particle size distribution measuring device.

The non-magnetic steel powder according to the present invention is a non-magnetic steel. The non-magnetic steel can be confirmed by measuring the relative magnetic permeability.

The relative magnetic permeability is measured by a single plate magnetic property test. Specifically, a 10×60×1 mm measurement piece is prepared from the manufactured body and measured by a micro single plate magnetic property tester capable of performing measurements according to JIS C 2556.

If the obtained value of the relative magnetic permeability is in the range of 1.00 to 1.02, it is determined to be non-magnetic.

The method for producing the non-magnetic steel powder according to the present invention is not particularly limited, and known methods (for example, a gas atomization method, a water atomization method, a plasma atomization method, a plasma rotating electrode method, and a centrifugal atomization method) can be used.

The content of the component (A) is preferably 85 mass % or more, more preferably 90 mass % or more, and still more preferably 95 mass % or more, with respect to the total amount of the powder metal material.

The component (A) may be used alone or in combination of two or more thereof.

(B) Ferrovanadium Nitride Powder

The powder metal material according to the present invention contains (B) a ferrovanadium nitride powder (hereinafter referred to as a "component (B)"). Note that the "ferrovanadium nitride powder" is also simply referred to as "ferrovanadium nitride".

Since ferrovanadium nitride has a melting point lower than that of iron, it can be easily melted and mixed during additive manufacturing.

Ferrovanadium nitride is not particularly limited, and commercially available products can also be suitably used.

As ferrovanadium nitride, for example, a powder commercially available from Greenearth Industry can be used.

The particle size of the component (B) according to the present invention is preferably 15.0 μm≤D50≤25.0 μm in terms of volume average particle size as measured by a laser diffraction particle size distribution measuring device.

D50 is not preferably more than 25.0 μm since mixing with the component (A) tends to be difficult to achieve uniformity, and the resulting filling rate may deteriorate. D50 is not preferably less than 15.0 μm since the mixing tends to be difficult to achieve uniformity, and the fluidity is deteriorated.

In addition, the particle size of the component (B) according to the present invention is preferably D10≥10.0 μm and D90≤30.0 μm in terms of volume average particle size as measured by a laser diffraction particle size distribution measuring device.

D90 is preferably 30.0 μm or less since it is easier to mix uniformly with the component (A), and when additive manufacturing is performed, the variation in nitrogen concentration is less likely to increase. On the other hand, D10 is preferably 10.0 μm or more since the fluidity of the powder metal material (mixed powder) is good.

The content of the component (B) is 0.3 mass % to 3.0 mass % with respect to the total amount of the powder metal material.

When the mixing ratio of ferrovanadium nitride in the powder metal material is large, nitrogen gas is generated during laser melting in additive manufacturing, which may cause gas defects inside the product or deteriorate the surface properties of the obtained product (manufactured body). As a result, the filling rate of the obtained manufactured body may deteriorate.

The present inventors have diligently studied how to improve the filling rate of the obtained manufactured body, and have paid attention to the nitrogen content in the manufactured body. It has been found that the filling rate is excellent by reducing the nitrogen content in the manufactured body to 0.3 mass % or less.

Therefore, the content of the component (B) in the powder metal material for additive manufacturing is desirably reduced to 0.3 mass % or less in terms of nitrogen content, assuming that the mixed powder in the powder metal material is all alloyed. In view of the above-recited points, the content of the component (B) is set to 3.0 mass % or less with respect to the total amount of the powder metal material.

In addition, the content of the component (B) is set to 0.3 mass % or more from the viewpoint of the effect of containing nitrogen in the manufactured body.

Further, the present inventors have found that the volume average particle size (D50) of the component (B) also contributes to the filling rate of the obtained manufactured body.

The detailed reason is unknown, and the volume average particle size (D50) of the component (B) is not preferably more than 25.0 μm since the component (B) and the component (A) tend to be difficult to be uniformly mixed, and the filling rate of the manufactured body may deteriorate. In addition, D50 of the component (B) is not preferably less than 15.0 μm since mixing with the component (A) tends to be difficult to achieve uniformity, and the fluidity is deteriorated. In view of the above-recited points, the particle size of the component (B) is set to 15.0 μm≤D50≤25.0 in terms of volume average particle size.

The content of the component (B) is preferably 0.5 mass % to 2.0 mass %, more preferably 0.5 mass % to 1.5 mass %, and still more preferably 0.8 mass % to 1.5 mass %, with respect to the total amount of the powder metal material.

The component (B) may be used alone or in combination of two or more thereof.

The powder metal material according to the present invention can be produced by appropriately mixing the component (A) and the component (B).

The powder metal material according to the present invention may contain further components within a range that does not impair the effects of the present invention. As a preferred embodiment, the powder metal material according to the present invention preferably consists of the component (A) and the component (B) only.

<Method for Producing Non-Magnetic Steel>

A method for producing the non-magnetic steel according to the present invention is a method for producing a non-magnetic steel having a nitrogen content of 0.3 mass % or less by performing 3D printing additive manufacturing on the above-recited powder metal material, and includes a step of performing 3D printing additive manufacturing on the above-recited powder metal material.

Specifically, the above-recited step is a step of performing manufacturing using a 3D printer by using the above-recited powder metal material. Accordingly, the above-recited non-magnetic steel can be produced.

The above-recited step is 3D printing manufacturing, and manufacturing is performed by cooling after the powder metal material is melted by laser or electron beam irradiation.

As the 3D printer, a known one can be used.

The additive manufacturing method is not particularly limited, and for example, a powder bed fusion method and a direct energy deposition method are preferred. Among these, a powder bed fusion method is particularly preferred.

As a preferred embodiment, in a powder bed fusion method, which is a type of additive manufacturing, by fusion bonding the powder metal material containing the component (A) and the component (B), a non-magnetic steel having a nitrogen content of 0.3 mass % or less can be suitably produced.

The nitrogen content in the non-magnetic steel (manufactured body) obtained by the above-recited production method is 0.3 mass % or less. When the nitrogen content is more than 0.3 mass %, the filling rate of the obtained manufactured body tends to decrease. From the viewpoint of the effect of nitrogen content in the manufactured body, the nitrogen content in the non-magnetic steel is preferably 0.05 mass %.

The nitrogen content (nitrogen concentration) is measured by local analysis with an electron beam probe microanalyzer (EPMA) at any five locations of the manufactured body.

Nitrogen is effective in improving the strength and the corrosion resistance of the non-magnetic steel, but requires special equipment such as a pressurized melting furnace and a large amount of energy in the conventional art. In contrast, in the present invention, nitrogen can be added simply by mixing ferrovanadium nitride with the raw material powder before manufacturing and performing additive manufacturing, thereby reducing the production cost and saving resources.

As described above, the above-recited non-magnetic steel is non-magnetic. This is because the component (A) is non-magnetic, and the nitrogen added by the component (B), i.e., ferrovanadium nitride, has the effect of further stabilizing the non-magnetic austenite phase.

The non-magnetic steel can be confirmed by measuring the relative magnetic permeability. The relative magnetic permeability is measured by a single plate magnetic property test. Specifically, a 10×60×1 mm measurement piece is prepared from the manufactured body and measured by a micro single plate magnetic property tester capable of performing measurements according to JIS C 2556.

If the obtained value of the relative magnetic permeability is in the range of 1.00 to 1.02, it is determined to be non-magnetic.

EXAMPLES

Hereinafter, the present invention will be described more specifically by way of Examples and Comparative Examples, but the present invention is not limited thereto.

(Component (A))

A non-magnetic steel powder 1 having a composition shown in Table 1 below (D10=20.5 μm, D90=64.0 μm in terms of volume average particle size measured with a laser diffraction particle size distribution measuring device (PSA1090 manufactured by Anton Paar GmbH)) was prepared by a gas atomization method.

TABLE 1

| | C (mass %) | Mn (mass %) | Inevitable impurities and Fe (mass %) |
|---|---|---|---|
| Non-magnetic steel powder 1 | 0.5 | 12.0 | Balance |

Note that the non-magnetic steel powder 1 was a non-magnetic steel being free of nitrogen.

Example 1 and Comparative Examples 1 and 2

A mixed powder (powder metal material) of the non-magnetic steel powder 1 and the component (B) shown in Table 2 was subjected to additive manufacturing using a 3D printer to produce each non-magnetic steel (manufactured body). M290 manufactured by EOS was used as the manufacturing machine, and the manufacturing conditions included an output of 240 W, a layer thickness of 40 μm, a scan speed of 900 mm/s, a hatch distance of 0.1 mm, and a preheating temperature of room temperature.

Note that the above-recited additive manufacturing method was a powder bed fusion method.

<Measurement of Nitrogen Content (Nitrogen Concentration)>

The nitrogen content (nitrogen concentration) was measured by local analysis with an electron beam probe microanalyzer (EPMA) at any five locations of the obtained manufactured body.

<Measurement of Filling Rate>

The filling rate was obtained by photographing an unpolished structure at any 15 locations of the obtained manufactured body with an optical microscope (Olympus Corporation GX51), and averaging the area ratio of a healthy part obtained by binarization.

The obtained results are shown in Table 2.

The content of the component (B) in Table 2 is a content (mass %) with respect to the total amount of the powder metal material.

The average particle size of the component (B) is the volume average particle size D50 measured with a laser diffraction particle size distribution measuring device (PSA1090 manufactured by Anton Paar GmbH).

The manufactured bodies obtained in Example 1 and Comparative Examples 1 and 2 were non-magnetic steels.

TABLE 2

| | Type of component (B) | Content (mass %) of component (B) | Average particle size (μm) | Nitrogen concentration (mass %) in manufactured body | Filling rate (%) of manufactured body |
|---|---|---|---|---|---|
| Example 1 | Ferrovanadium nitride 1 | 2.0 | 18.2 | 0.18 ± 0.02 | 99.9 |
| Comparative Example 1 | Ferrovanadium nitride 2 | 5.0 | 18.2 | 0.38 ± 0.07 | 99.0 |
| Comparative Example 2 | Ferrovanadium nitride 3 | 2.0 | 50.5 | 0.15 ± 0.09 | 98.6 |

Ferrovanadium nitrides 1 to 3 in Table 2 are as follows.

Ferrovanadium nitrides 1 and 2: obtained by classifying ferrovanadium nitride powder manufactured by Greenearth Industry into D50=18.2 μm, D10=15.2 μm, and D90=29.6 μm by pulverization Ferrovanadium nitride 3: obtained by classifying ferrovanadium nitride powder manufactured by Greenearth Industry into D50=50.5 μm, D10=35.3 μm, and D90=64.8 μm by pulverization The volume average particle size D10 and the volume average particle size D90 of ferrovanadium nitrides 1 to 3 were measured with a laser diffraction particle size distribution measuring device (PSA1090 manufactured by Anton Paar GmbH).

As can be seen from Table 2 that according to the powder metal materials in Example 1, it is possible to produce a manufactured body having an excellent filling rate.

Although the embodiment of the present invention has been described above, the present invention is not limited to the above-described embodiment, and modifications, improvements, and the like can be made as appropriate.

In the present description, at least the following matters are described.

(1) A powder metal material for additive manufacturing containing:

(A) a non-magnetic steel powder which is free of nitrogen; and (B) a ferrovanadium nitride powder, in which a particle size of the component (B) is 15.0 μm≤D50≤25.0 μm in terms of volume average particle size, and a content of the component (B) is 0.3 mass % to 3.0 mass % with respect to a total amount of the powder metal material.

According to (1), a manufactured body having an excellent filling rate can be obtained.

(2) A method for producing a non-magnetic steel including: performing 3D printing additive manufacturing on the powder metal material for additive manufacturing according to (1) to produce a non-magnetic steel having a nitrogen content of 0.3 mass % or less.

According to (2), a manufactured body having an excellent filling rate can be obtained.

What is claimed is:

1. A powder metal material for additive manufacturing comprising:

(A) a non-magnetic steel powder which is free of nitrogen; and (B) a ferrovanadium nitride powder, wherein a particle size of the component (B) is 15.0 μm≤D50≤25.0 μm in terms of volume average particle size, and a content of the component (B) is 0.3 mass % to 3.0 mass % with respect to a total amount of the powder metal material, and wherein nitrogen content of the powder metal material is 0.3 mass % or less.

2. The powder metal material for additive manufacturing according to claim 1, wherein the content of the component (B) is 0.5 mass % to 2.0 mass % with respect to the total amount of the powder metal material.

3. The powder metal material for additive manufacturing according to claim 1, wherein the content of the component (B) is 0.5 mass % to 1.5 mass % with respect to the total amount of the powder metal material.

4. The powder metal material for additive manufacturing according to claim 1, wherein the content of the component (B) is 0.8 mass % to 1.5 mass % with respect to the total amount of the powder metal material.

5. The powder metal material for additive manufacturing according to claim 1, wherein a content of the component (A) is 85 mass % or more with respect to the total amount of the powder metal material.

6. The powder metal material for additive manufacturing according to claim 2, wherein a content of the component (A) is 85 mass % or more with respect to the total amount of the powder metal material.

7. The powder metal material for additive manufacturing according to claim 1, wherein a content of the component (A) is 90 mass % or more with respect to the total amount of the powder metal material.

8. The powder metal material for additive manufacturing according to claim 2, wherein a content of the component (A) is 90 mass % or more with respect to the total amount of the powder metal material.

9. The powder metal material for additive manufacturing according to claim 1, wherein a content of the component (A) is 95 mass % or more with respect to the total amount of the powder metal material.

10. The powder metal material for additive manufacturing according to claim 2, wherein a content of the component (A) is 95 mass % or more with respect to the total amount of the powder metal material.

11. The powder metal material for additive manufacturing according to claim 1, wherein the non-magnetic steel powder contains 0.2 to 1.0 mass % of C with respect to a total amount of the non-magnetic steel powder.

12. The powder metal material for additive manufacturing according to claim 1, wherein the non-magnetic steel powder contains 8.0 to 15.0 mass % of Mn with respect to a total amount of the non-magnetic steel powder.

13. The powder metal material for additive manufacturing according to claim 11, wherein the non-magnetic steel powder contains 8.0 to 15.0 mass % of Mn with respect to a total amount of the non-magnetic steel powder.

14. A method for producing a non-magnetic steel comprising:
performing 3D printing additive manufacturing onto the powder metal material for additive manufacturing according to claim 1 so as to produce a non-magnetic steel having a nitrogen content of 0.3 mass % or less.

15. A non-magnetic steel made by a method comprising additive manufacturing using the powder metal material for additive manufacturing according to claim 1, wherein a nitrogen content of the non-magnetic steel is 0.3 mass % or less.

\* \* \* \* \*